United States Patent
Kulkarni et al.

(10) Patent No.: US 7,833,409 B2
(45) Date of Patent: Nov. 16, 2010

(54) METHODS AND SYSTEMS FOR REMOVING VANADIUM FROM LOW-GRADE FUELS

(75) Inventors: Parag Prakash Kulkarni, Clifton Park, NY (US); Gregg Anthony Deluga, Playa del Rey, CA (US); Arnaldo Frydman, Houston, TX (US); Gregory Ronald Gillette, Houston, TX (US); Narendra Joshi, Schenectady, NY (US); Ke Liu, Rancho Santa Margarita, CA (US); Vladimir Zamansky, Oceanside, CA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 11/847,898

(22) Filed: Aug. 30, 2007

(65) Prior Publication Data

US 2009/0057202 A1   Mar. 5, 2009

(51) Int. Cl.
*C10G 25/05* (2006.01)
(52) U.S. Cl. .................. 208/251 R; 208/88; 208/91; 208/92; 208/299; 203/41; 203/47
(58) Field of Classification Search ........... 208/88, 208/91–92, 251 R, 251 H, 299; 203/41, 47; 196/46.1; 210/660
See application file for complete search history.

(56) References Cited

U.S. PATENT DOCUMENTS

| | | | |
|---|---|---|---|
| 2,768,942 A * | 10/1956 | Marple, Jr. et al. ............ 203/41 |
| 3,936,371 A | 2/1976 | Ueda et al. |
| 4,191,636 A | 3/1980 | Fukui et al. |
| 4,376,695 A | 3/1983 | Belinko et al. |
| 4,528,100 A | 7/1985 | Zarchy |
| 4,645,589 A | 2/1987 | Krambeck et al. |
| 4,797,200 A | 1/1989 | Osterhuber |
| 5,817,229 A * | 10/1998 | Sudhakar et al. ............ 208/299 |
| 2005/0072137 A1* | 4/2005 | Hokari et al. ............ 60/39.461 |

OTHER PUBLICATIONS

Sinnott, R.K. (2005). Chemical Engineering Design, Butterworth-Heinemann, 1038 pgs (p. 728 cited in the Office action).*

* cited by examiner

*Primary Examiner*—Robert J Hill, Jr.
*Assistant Examiner*—Brian McCaig
(74) *Attorney, Agent, or Firm*—GE Global Patent Operation; Catherine J. Winter

(57) ABSTRACT

A method for treating fuel containing vanadium including extracting vanadium from the fuel with an adsorption material and fractionating the fuel into a light oil fraction and a heavy fuel fraction. The light fuel fraction has a reduced amount of vanadium. Systems for fuel preparation are also provided.

10 Claims, 6 Drawing Sheets

METHODS AND SYSTEMS FOR REMOVING VANADIUM FROM LOW-GRADE FUELS

FIELD OF THE INVENTION

This invention relates to methods and systems for purifying low-grade fuel and more particularly, to the removal of vanadium.

BACKGROUND OF THE INVENTION

Low-grade fuel is inexpensive fuel and it would be desirable to use it to fuel many types of engines, particularly, gas turbines. However, low-grade fuel contains a large amount of undesirable contaminants. A significant contaminant present in low-grade fuel is vanadium. Vanadium forms vanadium oxide, $V_2O_5$, in combustion chambers, which has a highly deleterious corrosive effect on gas turbine components. Accordingly, it is necessary to remove the vanadium from the low-grade fuel before the low-grade fuel can be used in gas turbines.

Magnesium-based compounds are often added to low-grade fuel to reduce the corrosive effect of vanadium. However, the use of magnesium as an additive results in the accumulation of ash-like deposits on interior gas turbine parts, which requires periodic shutdown and maintenance of the gas turbine to remove the deposits.

U.S. Pat. No. 4,528,100 to Zarchy discloses a two step process to decrease the vanadium content in residual oil. Residual oil is first broken down into an oil phase and an asphaltene phase by supercritical or conventional extraction. The vanadium is removed from the asphaltene phase by supercritical solvent extraction and the vanadium free asphaltene phase is then re-dissolved in the oil phase for use as a gas turbine fuel.

More efficient systems and methods that improve overall reliability and availability, are needed for removing vanadium compounds from low-grade fuel.

SUMMARY OF THE INVENTION

In one embodiment, a method for treating fuel containing vanadium comprises extracting vanadium from the fuel with an adsorption material and fractionating the fuel into a light fuel fraction and a heavy fuel fraction, whereby the light fuel fraction has a reduced amount of vanadium.

In another embodiment, a fuel preparation system for gas turbines wherein said system is integrated with a gas turbine, said system comprising a fractionation unit for treating fuel containing vanadium, said gas turbine connected to the fractionation unit to receive treated fuel and for delivering exhaust from the gas turbine to the fractionation unit as a stripping gas and to provide energy to the fractionation unit.

In another embodiment, a fuel preparation system for gas turbines wherein said system is integrated with a gas turbine, said system comprising a fractionation unit for treating fuel containing vanadium and a boiler for producing steam, said fractionation unit separating the fuel into a light fuel fraction and a heavy fuel fraction, said gas turbine connected to the fractionation unit to receive the light fuel fraction, said boiler connected to the fractionation unit to receive the heavy fuel fraction for combustion and for delivering steam to the fractionation unit as a stripping gas and to provide heat to the fractionation unit.

The various embodiments provide efficient methods and integrated systems for removing vanadium and sulfur from low-grade fuel and preparing fuel for gas turbines.

DETAILED DESCRIPTION OF THE INVENTION

Figure 1:
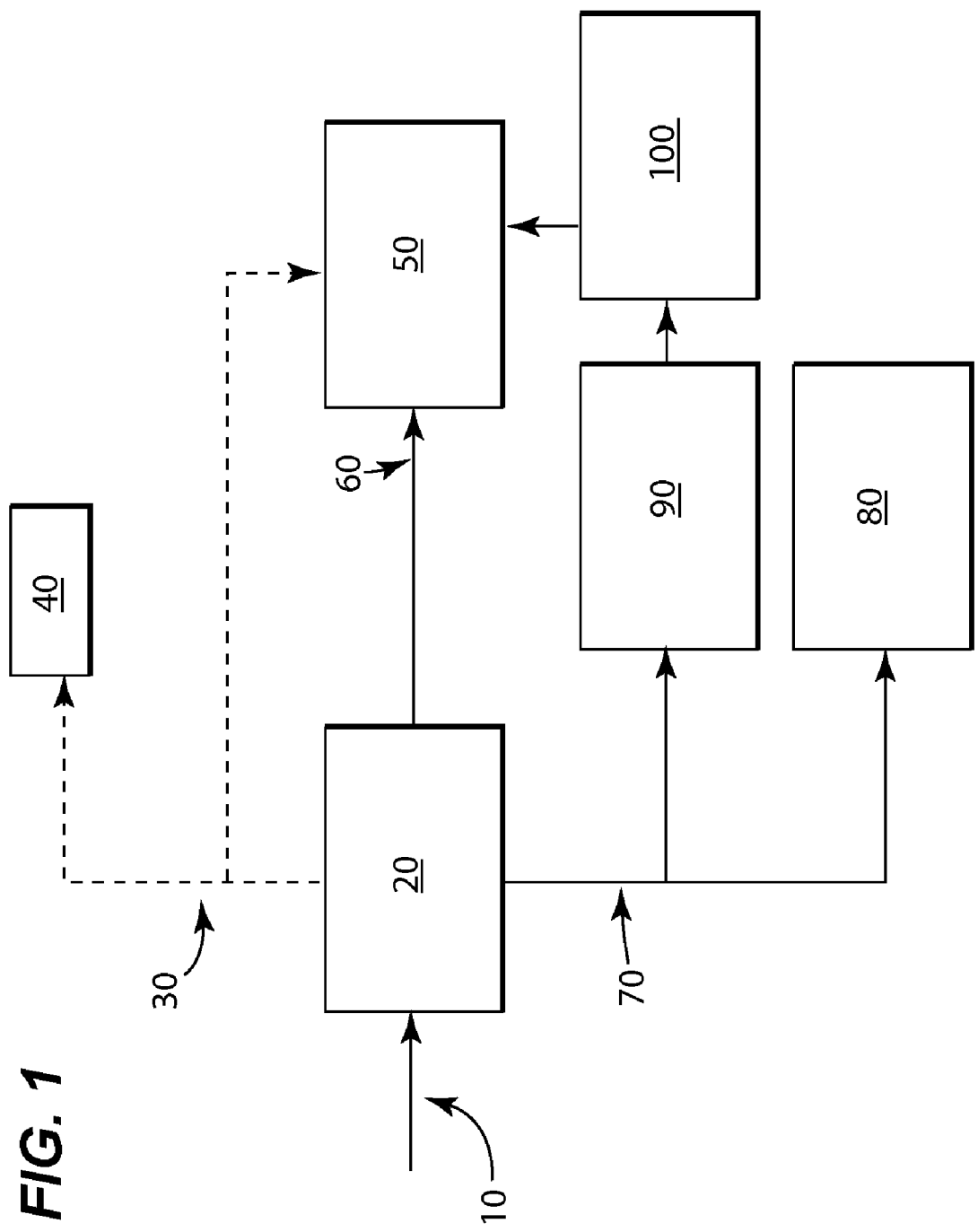
FIG. 1 is a schematic diagram depicting an exemplary embodiment of a method for removing vanadium from low-grade fuel.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a method for treating fuel containing vanadium comprises extracting vanadium from the fuel with an adsorption material and fractionating the fuel into a light fuel fraction and a heavy fuel fraction, whereby the light fuel fraction has a reduced amount of vanadium.

Fuel containing vanadium is fuel, such as a low-grade fuel or a heavy liquid fuel, having corrosive vanadium. The fuel may be fossil fuels, such as crude oils and bituminous, processed/distilled residues, such as coker oils, coker gas oils, atmospheric and vacuum residual oil, fluid catalytic cracker feeds, metal containing deasphalted oils and resins, processed residual oil and heavy oils. The fuel may also contain sulfur and other heavy metals.

The fuel containing vanadium can have a range of vanadium content and any level of vanadium can be treated. In one embodiment, the fuel has up to about 1000 ppm by weight vanadium. In another embodiment, the fuel has a vanadium content of about 0.2 ppm by weight or more. In another embodiment, the fuel has from about 0.2 ppm by weight to about 1000 ppm by weight vanadium. In one embodiment, the fuel comprises up to about 3 percent by weight sulfur. In another embodiment, the fuel has from about 10 ppm by weight or more of sulfur. In another embodiment, the fuel has from about 10 ppm by weight to about 3 percent by weight sulfur.

Fractionating the fuel containing vanadium separates the fuel into a light fuel fraction having a lower boiling point and a heavy fuel fraction having a higher boiling point. A gaseous phase may also be present, which is comprised of low molecular weight hydrocarbon gases, such as methane and ethane. The light fuel fraction is about 70 to about 95% by volume of the fractionating liquid. The heavy fuel fraction is about 5 to about 30% by volume of the fractionating liquid.

The gaseous phase may be present in an amount up to about 10% by volume of the fractionating liquid.

Fractionation occurs in a fractionation unit. The fractionation unit may be a fractionation column, distillation column, packed column, stripping column, bubble column or other suitable column for fractionation. The fractionation unit may be packed with packing material, such as pall rings. The fractionation unit is heated to a suitable temperature for fractionating the fuel containing vanadium. In one embodiment, the temperature for fractionating is in a range of from about 300° F. to about 1000° F. The fractionation unit may be equipped with a re-boiler for providing heat to the unit by boiling the fractionating liquid and driving the separation of the liquid. In other embodiments, the heat may be provided by a hot gas or steam, which is added to the fractionation unit as a stripping gas.

If a re-boiler is present, the re-boiler is connected to the fractionation unit to provide heat to the fractionation unit. In one embodiment, a re-boiler is connected to the bottom of the fractionation unit. The re-boiler receives a liquid stream from the bottom of the fractionation unit and partially or completely vaporizes the liquid, which is returned to the fractionation unit to drive the fractionation.

A stripping gas may be used in the fractionation unit to help remove contaminants, such as vanadium and other heavy metals and to provide heat for the fractionation unit. The stripping gas may be a hot inert gas, such as flue gas or exhaust gas or steam, which may be provided by the re-boiler or other boiler means. In one embodiment, the hot gas may be exhaust gas. In another embodiment, the exhaust gas may be from a gas turbine engine.

The light fuel fraction, which has a lower boiling point, rises to the top of the fractionation unit and can be removed from the top of the fractionation unit. If a gaseous phase is present, it will also be removed from the top of the fractionation unit with the light fuel fraction. The light fuel fraction is condensed to liquid form. The light fuel fraction has a reduced level of vanadium and may be used to fuel a gas turbine. When a gaseous phase is present, the gaseous phase is not condensed, but remains in a gaseous state. The gaseous phase can then be separated from the liquid fuel fraction in a separator. The gaseous phase may be used to fuel a gas turbine by feeding the gaseous phase to the gas turbine through gas nozzles suitable for combusting the gaseous phase hydrocarbon gases. The gaseous phase may be eliminated by using a flare, thermal oxidizer or other type of burner or may be burned in a furnace to provide heat for the fractionation unit.

The heavy fuel fraction, which has a higher boiling point, settles to the bottom of the fractionation unit and is removed from the bottom of the fractionation unit. Most of the vanadium settles in the heavy fuel fraction and is removed with the heavy fuel fraction. The heavy fuel fraction may be discarded, combusted, used for diesel engines or may be further processed. The heavy fuel fraction may be oxidized in the partial oxidation unit or autothermal cracking unit. The oxidized vanadium settles out of the heavy fuel fraction as a solid oxide and can be removed with the ash generated by the oxidation. The remaining portion of the heavy fuel fraction has reduced levels of vanadium and can be used as fuel for a gas turbine or to produce another form of fuel, such as syngas.

In some embodiments, the fuel containing vanadium may be sent to a partial oxidation unit or autothermal cracking unit prior to fractionation for oxidizing heavy metals, particularly when the fuel to be treated is very heavy.

The light fuel fraction is condensed in a condenser. The condenser may be any type of conventional condenser. The temperature of the condenser is suitable for condensing the light fuel fraction to a liquid, but not low enough to condense any gaseous phase. In one embodiment, the temperature of the condenser is from about 300° F. to about 600° F.

The condensed light fuel fraction may be separated from any gaseous phase in a separator. The separator may be any type of conventional separator for separating liquids and gases. In one embodiment, the separator may be a centrifuge.

Extraction may occur separately from the fractionation unit or in the fractionation unit and may occur simultaneously with fractionation. Vanadium is extracted from the fuel containing vanadium by adsorption materials. The adsorption materials remove the vanadium from the fuel by trapping the vanadium inside the fractionation unit or other adsorption column that is being used. In one embodiment, the fractionation unit contains adsorption materials. In another embodiment, the adsorption materials are packed into a distillation column, fractionation column, packed column, stripping column, bubble column or other suitable column for fractionation. In another embodiment, the adsorption materials may be packing material for the fractionation unit. The adsorption materials remove and trap the vanadium in the column and aid in fractionation by providing a gas-liquid contact surface for the fractionation.

In another embodiment, one or more adsorption columns may be used separately from the fractionation unit. The adsorption column(s) are packed with adsorption materials and may be located downstream from the fractionation unit to provide one or more extraction sites.

The adsorption materials are added to the fractionation unit or other adsorption columns by conventional methods. In one embodiment, the adsorption materials are added to a distillation column, fractionation column, packed column, stripping column, bubble column or other suitable column for fractionation or adsorption by column packing. In another embodiment, distillation packing media, such as pall rings, are coated with vanadium sorbent material and packed into a distillation column.

The adsorption materials may be any suitable vanadium sorbent material. In one embodiment, the adsorption materials include magnesium oxide, cobalt oxide, molybdenum oxide, activated carbon, zeolites or combinations thereof. The adsorption materials remove the vanadium from the fuel by trapping the vanadium inside the fractionation unit or other type of adsorption column that is being used. When the adsorption materials become saturated with the vanadium, the adsorptive capacity of the materials may be regenerated by acid extraction during scheduled shutdowns.

The adsorption materials are used in any amount sufficient to remove vanadium from the fuel containing vanadium. In one embodiment, the amount of adsorption material is from about 1 to about 100 percent by weight based on the weight of the fuel. In another embodiment, the amount of adsorption material is from about 5 to about 50 percent by weight based on the weight of the fuel. In another embodiment, the amount of adsorption material is from about 5 to about 30 percent by weight based on the weight of the fuel.

Treated fuel is fuel that has a reduced level of vanadium and is obtained from the light fuel fraction. The actual amount of vanadium will vary depending on the starting amount in the fuel. In one embodiment, the treated fuel has about 1 ppm by weight or less of vanadium. In another embodiment, the treated fuel has about 0.5 ppm by weight or less of vanadium. In another embodiment, treated fuel has about 0.2 ppm by weight or less of vanadium. In one embodiment, the treated fuel has less than 0.5 ppm vanadium and may be used to fuel a gas turbine.

Fuel for gas turbines must have low levels of vanadium to minimize gas turbine corrosion. Fuel with higher levels of vanadium can be used to fuel a gas turbine, but the engine life will be shortened. In one embodiment, a fuel for a gas turbine has about 0.5 ppm by weight or less of vanadium. In another embodiment, the fuel for a gas turbine has about 0.2 ppm by weight or less of vanadium. Fuel for a gas turbine may also be obtained by blending the treated fuel with fuel having very low levels of vanadium, such as less than 0.2 ppm by weight, to prepare fuel having less than 0.5 ppm by weight vanadium or even less than 0.2 ppm by weight vanadium.

The gas turbine can be any type of gas turbine known in the art. In one embodiment, the gas turbine is on a ship.

The treated light fuel fraction may be fed to the gas turbine in any conventional manner, such as through pipes or tubing. In one embodiment, the light fuel fraction is fed to the gas turbine by injection. In another embodiment, the light fuel fraction is injected to the gas turbine with dual fuel nozzles for gases and liquids.

FIG. 1 is a schematic diagram depicting an exemplary embodiment of a process for removing vanadium from fuel containing vanadium 10. The fuel 10 is fed to a fractionation unit 20 comprising an adsorption material (not shown) for extracting vanadium. In the fractionation unit, the fuel is fractionated or separated into a light fuel fraction and a heavy fuel fraction. A gaseous phase comprising light hydrocarbon gases may also form during fractionation in the fractionation unit 20. The light fuel fraction and gaseous phase, if present, are removed from the top of the fractionation unit 20 and fed to a condenser (not shown). The light fuel fraction is condensed to a liquid and the gaseous phase, if present, remains in the vapor state. The condensed light fuel fraction is separated from the gaseous phase, if present, in a separator (not shown). The gaseous phase 30, if present, may be combusted in a flare 40 or may be fed to a gas turbine 50 equipped with gas nozzles (not shown) suitable for combusting the gaseous phase hydrocarbon gases.

The condensed light fuel fraction 60 is a liquid having a reduced amount of vanadium. In one embodiment, the light fuel fraction has less than 0.5 ppm by weight vanadium and may be used to fuel a gas turbine 50. In another embodiment, the light fuel fraction 60 is blended with fuel having low levels of vanadium (not shown) to produce a blend having less than about 0.5 ppm by weight vanadium and may be used to fuel a gas turbine.

The heavy fuel fraction 70 has a high vanadium content and is removed from the bottom of the fractionation unit 20. The heavy fuel fraction 70 may be discarded or used for fueling an internal combustion engine 80, such as a diesel engine. In another embodiment, the heavy fuel fraction 70 may be further treated for vanadium removal in a fuel partial oxidation or authothermal cracking unit 90. The vanadium is oxidized in the fuel partial oxidation or authothermal cracking unit 90 and forms a solid. The solid vanadium and ash from the fuel partial oxidation unit or autothermal cracking unit 90 are separated from the treated fuel in a separator 100, such as a cyclone, and discarded. In one embodiment, the he treated fuel has less than 0.5 ppm by weight and may be used to fuel the gas turbine 50.

In another embodiment, a method for removing vanadium from fuel containing vanadium may further comprise a reboiler to aid in fractionation and to effectively use the gaseous phase that may be formed in the fractionation unit.

Figure 2:
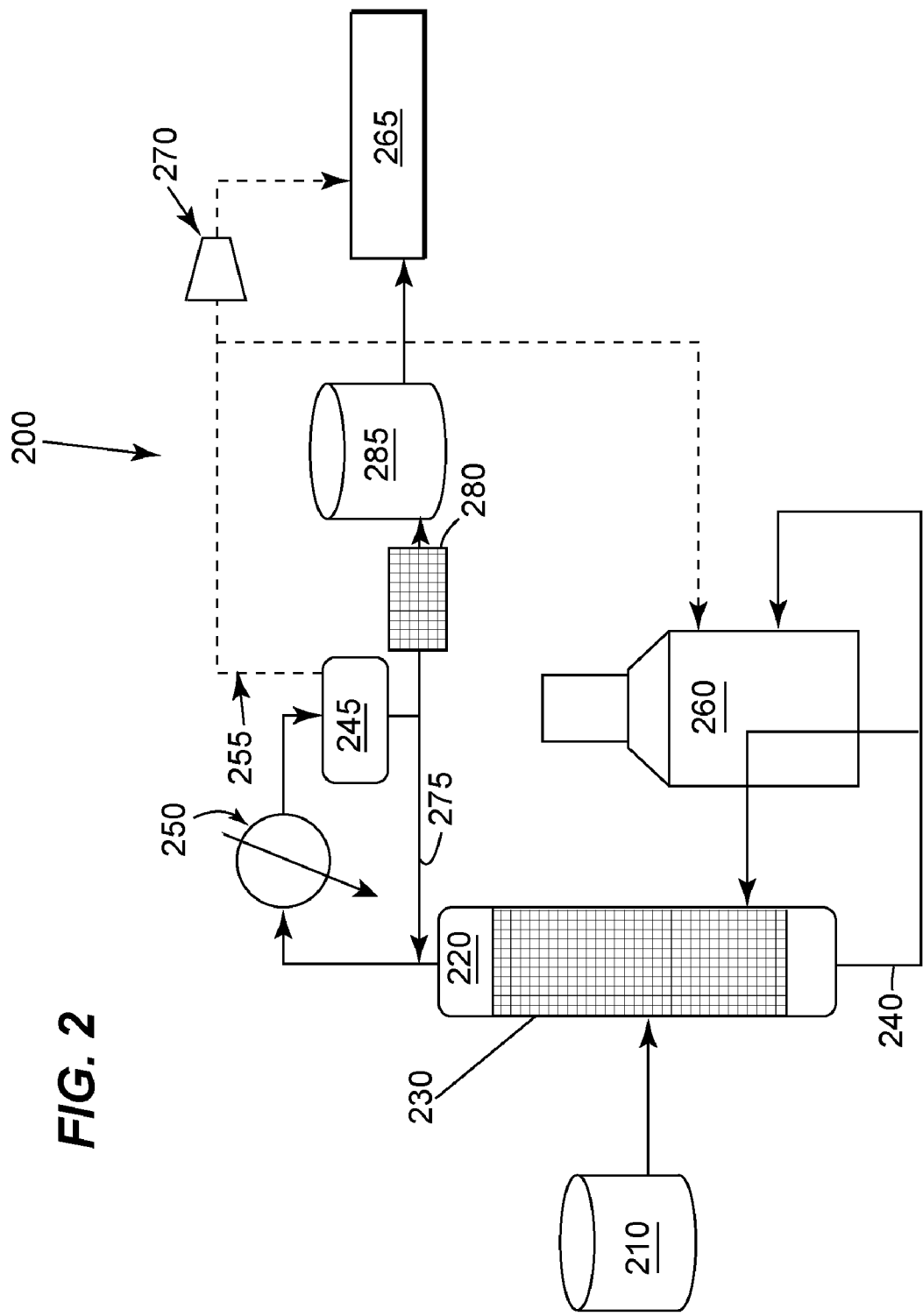
FIG. 2 is a schematic diagram depicting an exemplary embodiment of a fuel preparation system for a gas turbine.

FIG. 2 depicts an exemplary embodiment of a fuel preparation system 200. Fuel 210 containing vanadium is fed to a fractionation unit 220, which is optionally packed with adsorption material 230. In the fractionation unit 220, the fuel 210 is separated into a light fuel fraction, which is removed from the top of the fractionation unit 220 and a heavy fuel fraction 240, which is removed from the bottom of the fractionation unit 220. The fuel may also be separated into a gaseous phase, which is removed from the top of the fractionation unit 220. In one embodiment, the light fuel fraction and any gaseous phase are removed from the top of the fractionation unit 220 together. The light fuel fraction and gaseous phase are fed into a condenser 250, which condenses the light fuel fraction, but maintains the gaseous phase in vapor form. The condensed light fuel fraction and gaseous phase are fed to a separator 245 for separating the liquid light fuel fraction from the gaseous phase. The separated gaseous phase 255, if any, may be burned in a flare or burner (not shown) or may be burned in a furnace, such as a reboiler 260. In another embodiment, the gaseous phase may be fed to a gas turbine 265 through a gas compressor 270.

The condensed and separated light fuel fraction 275 has a reduced amount of vanadium. A portion of the condensed light fuel fraction 275 may be returned to the fractionation unit 220 for refluxing. The light fuel fraction may pass through an optional adsorption column 280 packed with adsorption materials for extraction of vanadium and/or other heavy metals. In one embodiment, the treated fuel has less than about 0.5 ppm by weight vanadium and is suitable for fueling a gas turbine 265. Optionally, the treated fuel may be stored in a tank 285 until needed for fueling the gas turbine 265.

The heavy fuel fraction 240 contains many impurities, such as vanadium, asphaltene, nickel and sulfur, and is removed from the bottom of the fractionation unit 220. The heavy fuel fraction 240 may be discarded (not shown), used for fueling a diesel engine (not shown) or further processed in an autothermal cracking unit or a partial oxidation unit (as shown in FIG. 1) to remove the impurities and recover high-grade fuel. In another embodiment, a part or all of the heavy fuel fraction 240 may be passed through tubes of a heater (not shown) in a fired re-boiler 260 to generate vapors, which are recycled to the fractionation unit 220 to provide heat for fractionation.

The fuel preparation system may be fully integrated with a gas turbine to provide an efficient and compact system for fueling a gas turbine. In one embodiment, a fuel preparation system for gas turbines wherein said system is integrated with a gas turbine, said system comprising a fractionation unit for treating fuel containing vanadium, said gas turbine connected to the fractionation unit to receive treated fuel and for delivering exhaust from the gas turbine to the fractionation unit as a stripping gas and to provide energy to the fractionation unit. The treated fuel may be fed to the gas turbine by conventional manner, such as through piping or tubing.

The energy for the fractionation is provided by hot exhaust from the gas turbine, which has a temperature of from about 600° F. to about 1200° F. The hot exhaust from the gas turbine is fed to the fractionation unit in any conventional manner, such as through pipes or tubing. The exhaust mixes with the fractionating fuel and heats the fuel to suitable temperatures for fractionation. The exhaust also acts as a stripping gas to remove vanadium and other heavy metals from the fractionating fuel. The exhaust is vented at the top of the fractionation unit. In one embodiment, gas turbine exhaust is fed to the bottom of a stripping column and is ventilated at the top of the stripping column.

Figure 3:
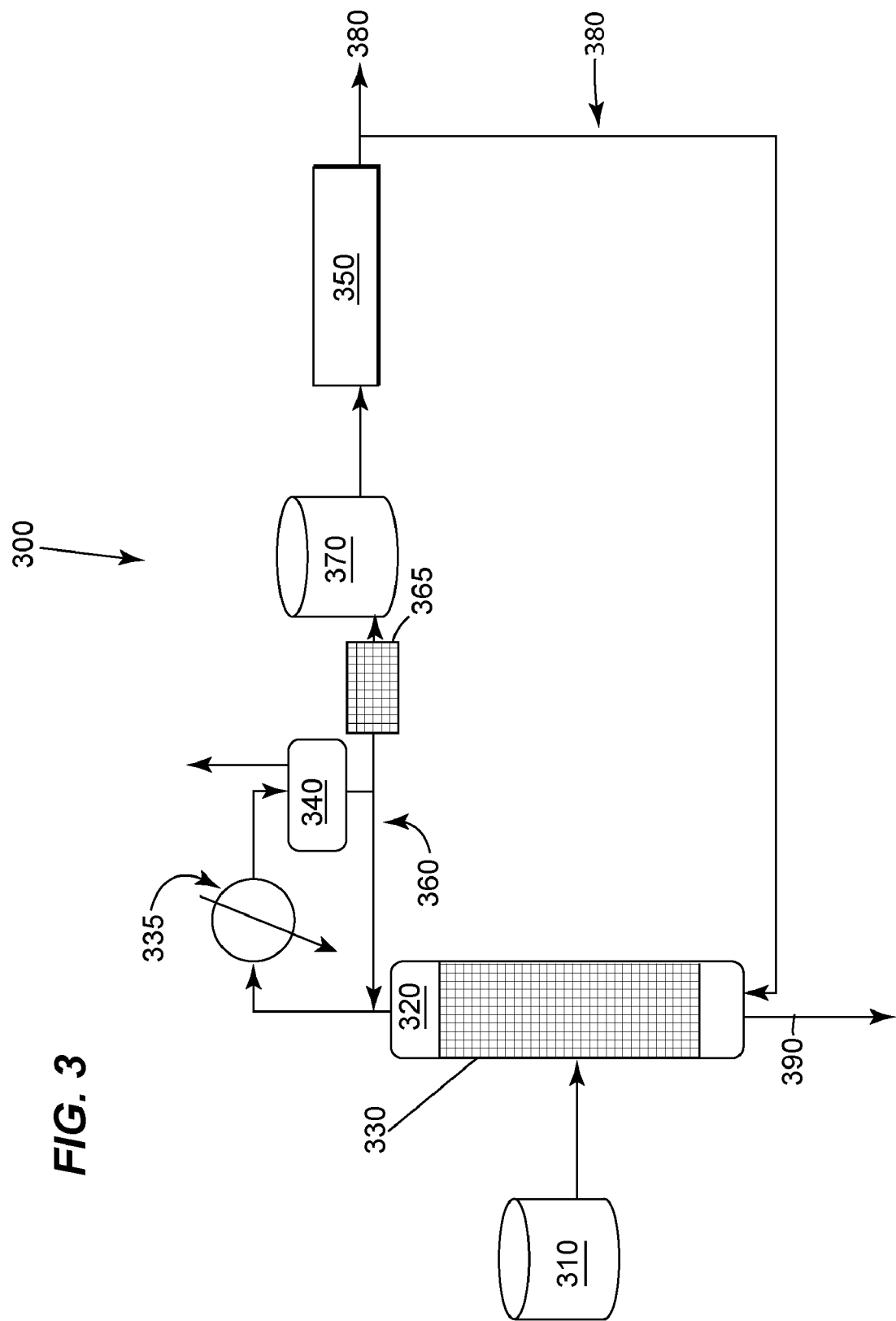
FIG. 3 is a schematic diagram depicting an exemplary embodiment of a fuel preparation system for a gas turbine.

FIG. 3 is a schematic diagram depicting an exemplary embodiment of a fuel preparation system 300. Fuel 310 containing vanadium is fed into a fractionation unit 320 that is optionally packed with adsorption material 330. The fuel 310 is fractionated or separated into a light fuel fraction and a heavy oil fraction. A gaseous phase comprising low molecular weight hydrocarbon gases may also be formed. The gaseous phase, if present, and light fuel fraction are removed from the top of the fractionation column 320, fed to a condenser 335 for condensing the light fuel fraction and to a separator 340 for separating the light fuel fraction from the gaseous phase. The gaseous phase may be vented or sent to a flare, burner or thermal oxidizer for burning (not shown). The gaseous phase may also be fed to a gas turbine equipped with fuel nozzles for combusting the gaseous phase (not shown). The condensed and separated light fuel fraction 360 has a reduced amount of vanadium. A portion of the condensed light fuel fraction 360 may be returned to the fractionation unit 320 for refluxing. The light fuel fraction 360 may pass through an optional adsorption column 365 packed with adsorption materials for extraction of vanadium and/or other metals. In one embodiment, the treated fuel has less than about 0.5 ppm by weight vanadium and may be fed directly to a gas turbine 350. Optionally, the treated fuel may be stored in a tank 370 until needed for fueling the gas turbine 350.

Exhaust 380 from the gas turbine 350 may be ventilated or fed to the bottom of the fractionation unit 320 through suitable pipes or tubing where the hot exhaust 380 acts as a stripping gas in the fractionation unit 320 and provides heat for the fractionation unit 320. The exhaust stripping gas 380 is vented with the gaseous phase at the top of the fractionation unit.

The heavy fuel fraction 390 contains many impurities, such as vanadium, asphaltene, nickel and sulfur, and is removed from the bottom of the fractionation unit 320. The heavy fuel fraction 390 may be discarded, used for fueling a diesel engine (not shown) or further processed in an autothermal cracking unit or a partial oxidation unit (as shown in FIG. 1) to remove the impurities and recover high-grade fuel.

In another embodiment, the heavy fuel fraction may be combusted in a burner and the hot combustion gas from the burner may be fed through coils in the fractionation unit to heat the fractionation unit.

Figure 4:
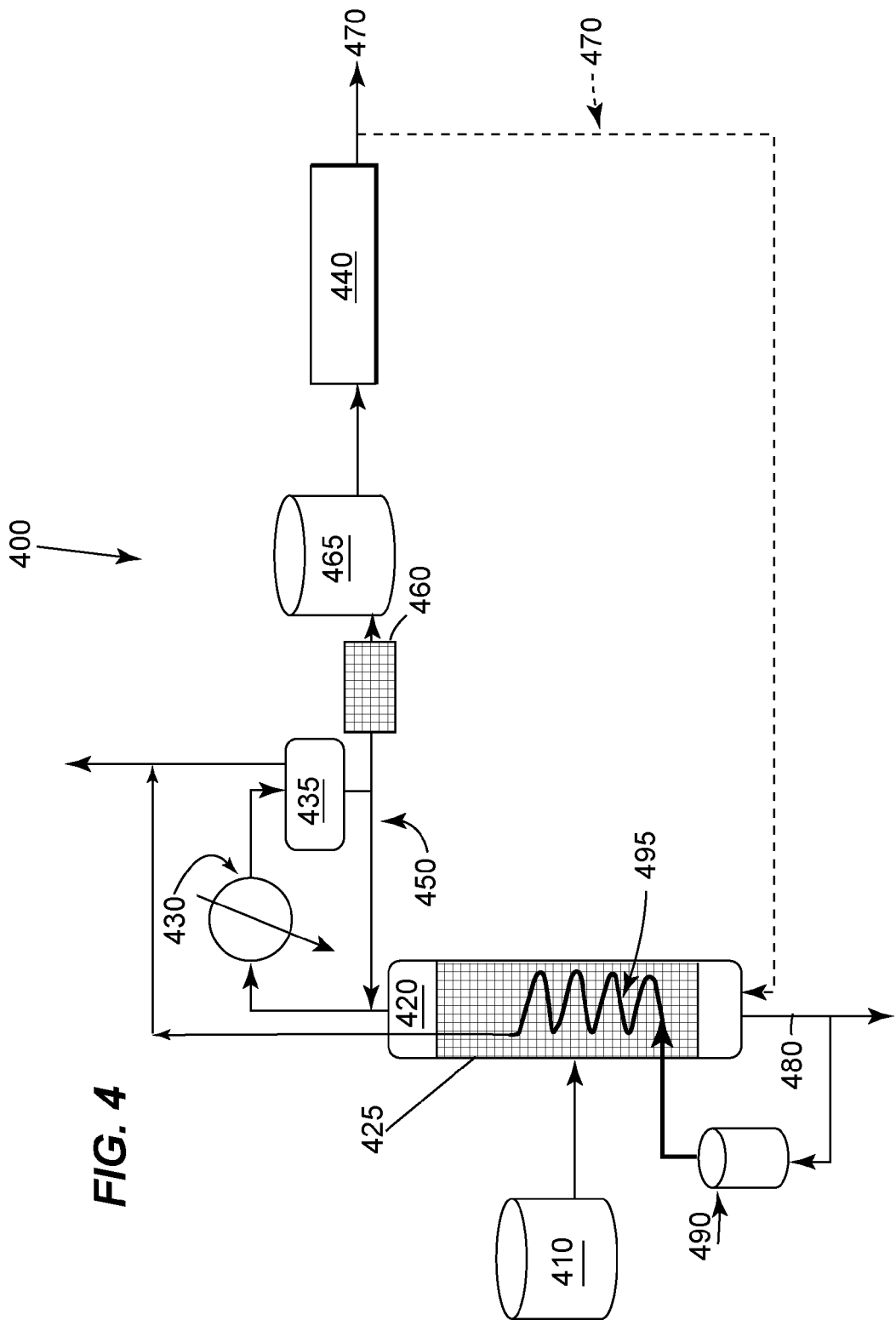
FIG. 4 is a schematic diagram depicting an exemplary embodiment of a fuel preparation system for a gas turbine.

FIG. 4 depicts an exemplary embodiment of a fuel preparation system 400. Fuel 410 containing vanadium is fed into a fractionation column 420 that is optionally packed with adsorption material 425. The fuel 410 is fractionated or separated into a light fuel fraction and a heavy oil fraction. A gaseous phase comprising low molecular weight hydrocarbon gases may also be formed. The gaseous phase, if present, and light fuel fraction are removed from the top of the fractionation column 420, fed to a condenser 430 for condensing the light fuel fraction and to a separator 435 for separating the light fuel fraction from the gaseous phase. The gaseous phase, if present, is vented or sent to a flare, burner or thermal oxidizer for burning (not shown). The gaseous phase may also be fed to a gas turbine for fuel (not shown). The condensed and separated light fuel fraction 450 has a reduced amount of vanadium. A portion of the condensed light fuel fraction 450 may be returned to the fractionation unit 420 for refluxing. The light fuel fraction 450 may pass through an optional adsorption column 460 for extraction of vanadium and/or other metals. In one embodiment, the treated fuel has less than 0.5 ppm by weight vanadium and may be fed directly to the gas turbine 440. Optionally, the treated fuel may be stored in a tank 465 until needed for fueling the gas turbine 440.

Exhaust 470 from the gas turbine 440 may be ventilated or fed to the bottom of the fractionation unit 420 through suitable pipes or tubing where the hot exhaust 470 acts as a stripping gas in the fractionation unit 420 and provides heat for the fractionation unit 420. The exhaust stripping gas 470 is vented with the gaseous phase at the top of the fractionation unit 420.

The heavy fuel fraction 480 contains many impurities, such as vanadium, asphaltene, nickel and sulfur, and is removed from the bottom of the fractionation unit 420. The heavy fuel fraction 480 may be discarded, used as fuel for a diesel engine (not shown) or further processed in an autothermal cracking unit or a partial oxidation unit (as shown in FIG. 1) to remove the impurities and recover high-grade fuel. In one embodiment, a portion or all of the heavy fuel fraction 480 is fed to a burner 490 where the heavy fuel fraction is combusted. The hot combustion gas from the burner 490 is fed through coils 495 within the fraction unit 420 to heat the fractionation unit 420. The hot combustion gas is vented through the top of the fractionation unit 420.

In another embodiment, a fuel preparation system for gas turbines wherein said system is integrated with a gas turbine, said system comprising a fractionation unit for treating fuel containing vanadium and a boiler for producing steam, said fractionation unit separating the fuel into a light fuel fraction and a heavy fuel fraction, said gas turbine connected to the fractionation unit to receive the light fuel fraction, said boiler connected to the fractionation unit to receive the heavy fuel fraction for combustion and for delivering steam to the fractionation unit as a stripping gas and to provide heat to the fractionation unit.

Most of the vanadium settles in the heavy fuel fraction and is removed with the heavy fuel fraction from the bottom of the fractionation unit. The heavy fuel fraction is removed from the bottom of the fractionation unit and may be fed to a boiler for combustion. The heat released from combusting the heavy gas fraction in the boiler is used to produce steam in the boiler. The steam is used as a stripping gas to entrain the light fuel fraction and to provide heat for the fractionation. The steam is fed to the fractionation unit through suitable pipes or tubing.

The light fuel fraction and steam exit the top of the fractionation unit and are condensed in a condenser to form an oil and water mixture. The oil and water mixture is separated in a separator. The separator is any type of separator used in the industry for separating oil and water. In one embodiment, the separator may be a centrifuge.

The boiler may be any type of boiler suitable for producing high temperature superheated steam and for combusting the heavy fuel fraction. Water is added to the boiler for producing steam. The steam is prepared in a boiler as a high temperature superheated steam. Temperatures for the boiler are from about 600° F. to about 1200° F. The heavy fuel fraction may be fed to the boiler by any means known in the art. In one embodiment, the heavy fuel fraction is transported to the boiler by pipes or tubing. The steam may be transported to the fractionation unit by conventional means. In one embodiment, the steam is transported to the fractionation unit by pipes or tubing.

In one embodiment, the fuel preparation system may be integrated with a fuel washing unit that is used for washing the fuel containing vanadium with water to remove impurities, such as alkali metals. The wash water can be discarded or recycled to the boiler to make steam. Exhaust from a gas turbine may be used to preheat the water for producing the steam in the boiler.

Figure 5:
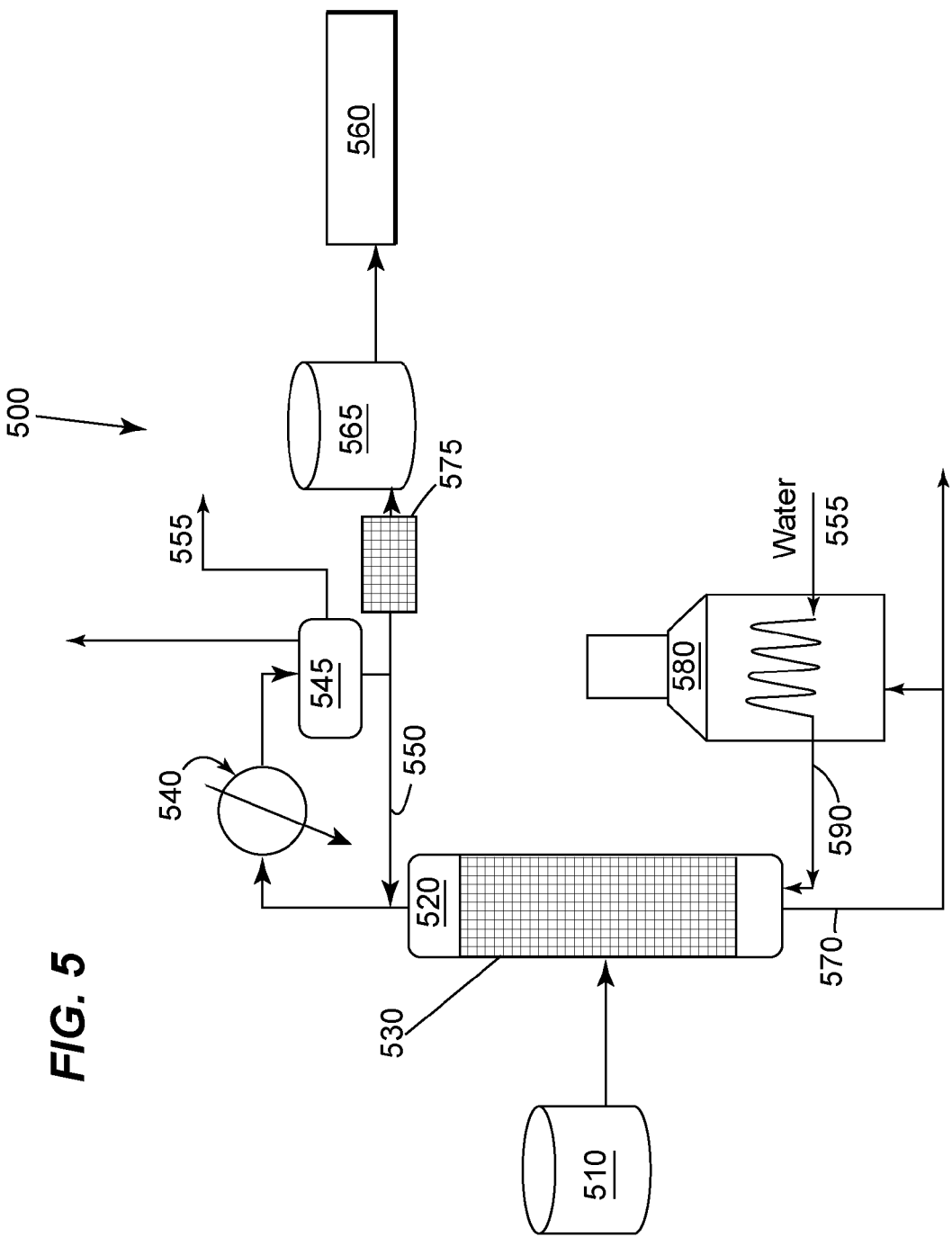
FIG. 5 is a schematic diagram depicting an exemplary embodiment of a fuel preparation system for a gas turbine.

FIG. 5 depicts an exemplary fuel preparation system 500. A fuel containing vanadium 510 is fed to a fractionation unit 520 that is optionally packed with adsorption material 530. The fuel is fractionated or separated into a light fuel fraction and a heavy fuel fraction. A gaseous phase comprising low molecular weight hydrocarbon gases may also be formed.

The gaseous phase, if present, and light fuel fraction are removed from the top of the fractionation unit 520, fed to a condenser 540 for condensing the light fuel fraction and to an oil and water separator 545 where the gaseous phase and water are separated from the fuel. The gaseous phase is vented or sent to a flare, burner or thermal oxidizer for burning the gaseous phase (not shown). The separated water 555 may be discarded or may be treated and recycled to a boiler 580 for producing steam 590. The condensed and separated light fuel fraction 550 has a reduced amount of vanadium. A portion of the condensed light fuel fraction 550 may be returned to the fractionation unit 520 for refluxing. The light fuel fraction 550 may pass through an optional adsorption column 575 for extraction of vanadium and/or other metals. In one embodiment, the treated fuel has less than 0.5 ppm vanadium and may be fed directly to a gas turbine 560. Optionally, the treated fuel or may be stored in a tank 565 until needed for fueling the gas turbine 560.

The heavy fuel fraction 570 has many impurities, such as vanadium, asphaltene, nickel and sulfur, and is removed from the bottom of the fractionation unit 520. The heavy fuel fraction 570 may be discarded, used to fuel a diesel engine (not shown), or further processed in an autothermal cracking unit or a partial oxidation unit (as shown in FIG. 1) to remove the impurities and recover high-grade fuel. In one embodiment, a portion or all of the heavy fuel fraction 570 is fed to a boiler 580 and combusted to provide heat for producing steam 590. Water 555, which originate from the oil and water separator 545, is fed to the boiler 580 and heated to produce steam 590. The steam 590 is fed to the fractionation unit 520 as a stripping gas and to provide heat for the fractionation unit 520. The steam 590 exits the top of the fractionation unit 520, is condensed in the condenser 540 and separated from the light fuel fraction in the separator 545. As explained above, the water from the separator 545 is discarded or optionally treated and recycled to the boiler for producing steam.

In another embodiment, the fuel containing vanadium may also be treated to reduce the level of sulfur. In one embodiment, a method for treating fuel containing vanadium and sulfur comprises extracting vanadium and sulfur from the fuel and fractionating the fuel into a light fuel fraction and a heavy fuel fraction, whereby the treated light fuel fraction has a reduced amount of vanadium and sulfur.

Treated fuel is fuel that has a reduced level of vanadium and a reduced level of sulfur and is obtained from the light fuel fraction. The actual amount of sulfur will vary depending on the starting amount in the fuel. In one embodiment, treated fuel has about 1 percent by weight or less of sulfur. In another embodiment, the treated fuel has about 1000 ppm by weight or less of sulfur. In another embodiment, the treated fuel has from about 5 ppm by weight to about 1000 ppm by weight of sulfur.

Sulfur may be extracted by using a sulfur-capturing sorbent. The sulfur capturing sorbent may include zinc oxide, iron oxide, alumina, ceria, cobalt-molybdenum oxide, zeolite, activated carbon silicon dioxide, S Zorb® or combinations thereof. In another embodiment, sulfur removal columns may be used.

Figure 6:
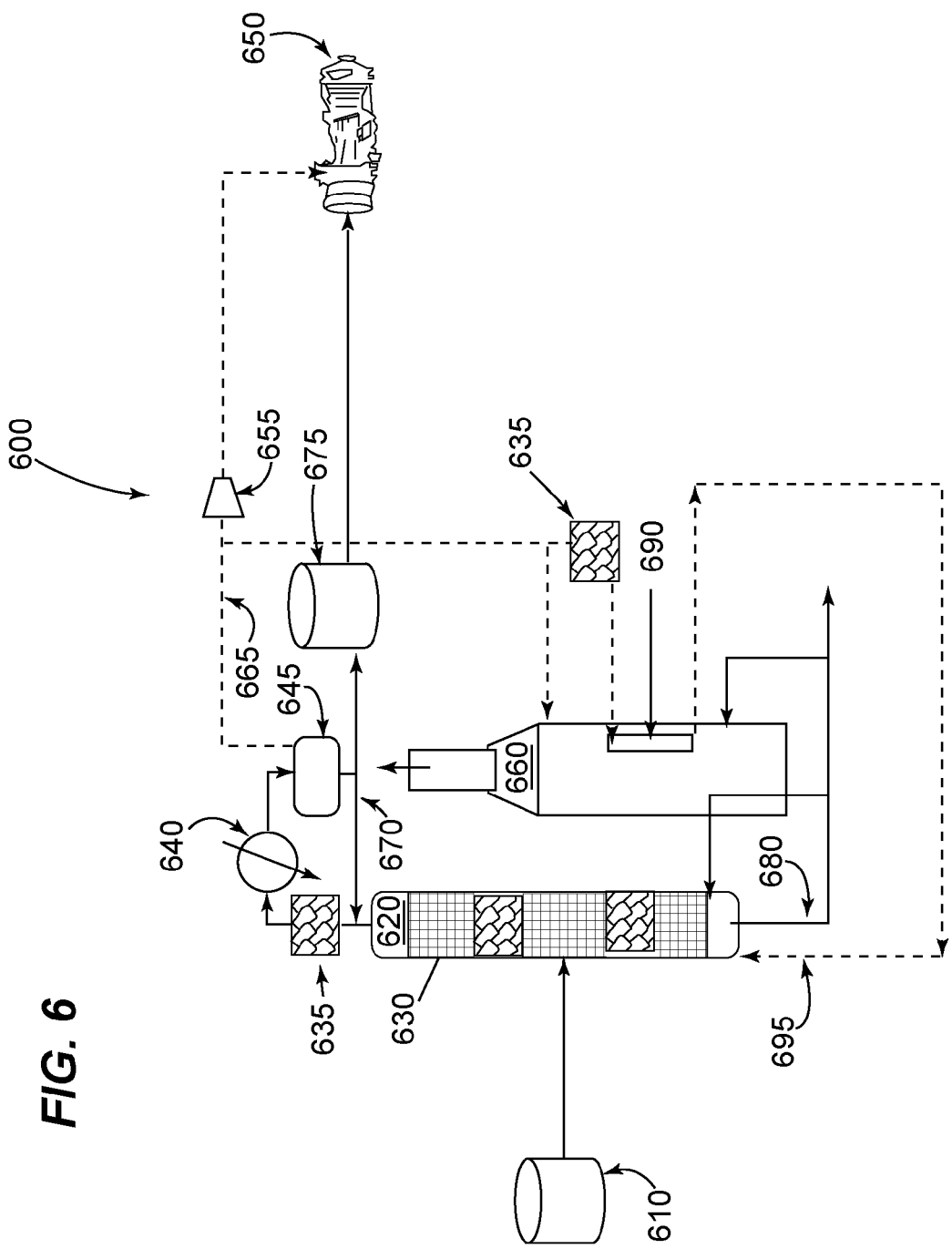
FIG. 6 is a schematic diagram depicting an exemplary embodiment of a fuel preparation system for a gas turbine.

FIG. 6 depicts an exemplary fuel preparation system 600. Fuel 610 containing vanadium and sulfur is fed to a fractionation unit 620 that is packed with adsorption material 630, including vanadium adsorption material and sulfur adsorption material. The fuel 610 is fractionated or separated into a light fuel fraction and a heavy fuel fraction. A gaseous phase comprising low molecular weight hydrocarbon gases may also be formed. The gaseous phase, if present, and light fuel fraction are removed from the top of the fractionation unit 620 and fed to a high temperature sulfur removal column 635. The light fuel fraction and gaseous phase, if present, are then fed to a condenser 640 for condensing the light fuel fraction and to a separator 645 where the gaseous phase is separated from the light fuel fraction. The gaseous phase 665 can be fed to a gas turbine 650 through a gas compressor 655, may be fed to a fired reboiler 660 for combustion or may be fed to a hydrogen generator/reformer 690 (described below) in the reboiler 660. The gaseous phase 665 may optionally be fed through a low temperature sulfur removal column 635 before passing into the hydrogen generator/reformer 690.

In one embodiment, the light fuel fraction 670 has less than 0.5 ppm vanadium and less than 1 percent by weight sulfur and can be fed to a gas turbine 650. A portion of the condensed light fuel fraction 670 may be returned to the fractionation unit 620 for refluxing. The light fuel fraction 670 may be fed directly to the gas turbine 650 or may be stored in a tank 675 until needed for fueling the gas turbine 650.

The heavy fuel fraction 680 contains many impurities, such as vanadium, asphaltene, nickel and sulfur, and is removed from the bottom of the fractionation unit 620. The heavy fuel fraction 680 may be discarded, used to fuel a diesel engine (not shown), further processed in an autothermal cracking unit or a partial oxidation unit (as shown in FIG. 1) to remove the impurities and recover high grade oil. A portion of the heavy fuel fraction 680 may be passed through tubes of a heater (not shown) in a fired reboiler 660 to generate vapors, which are recycled to the fractionation unit 620. A portion of the heavy fuel fraction 680 may be fed to the fired reboiler 660 and combusted to provide heat for the fired reboiler 660. The fired reboiler 660 may optionally contain a hydrogen generator/reformer 690 to produce gas containing hydrogen 695, which is fed to the fractionation unit 620 to assist capture of sulfur on the adsorbents as a stripping gas. The stripping gas exits the fractionation unit 620 at the top and is separated along with the gaseous phase 665 and sent to the gas turbine 650, flare (not shown) or reboiler 660.

The fuel systems are efficient and compact systems for preparing fuel for gas turbines. The fuel gas preparation systems may be used on board ships to prepare fuel for the gas turbines while at sea. The fuel preparation systems may be used on a dock for providing fuel to ships while docked or for land-based applications. The fuel preparation systems may be used to prepare fuel for one gas turbine or for several gas turbines.

In order that those skilled in the art will be better able to practice the present disclosure, the following examples are given by way of illustration and not by way of limitation.

EXAMPLES

Example 1

Heavy fuel oil having about 32 ppm vanadium was continuously fed to a packed column. The packed column was packed with vanadium adsorbents and heated to 400-1000° F. The heavy fuel oil was separated into a light oil fraction and a heavy oil fraction. The light oil fraction was about 83% by volume and rose to the top of the packed column. The remaining 17% by volume was the heavy oil fraction, which settled to the bottom of the column. The light oil fraction was removed and condensed in a condenser. Any vapors and other light gases were vented. The light oil fraction results are shown in Table 1 below.

TABLE 1

| Property | Specification limit for Gas turbine fuel | Crude Oil sample | Purified sample |
| --- | --- | --- | --- |
| Ash, ppm | 100 | 0.07 | 0.001 |
| Sulfur, % | 1 | 2.75 | 1.62 |
| Vanadium, ppm | 0.2 | 35.4 | 0.1 |
| Hydrogen content, % | 12.7 | 11.6 | 12.37 |
| Carbon residue, % | 0.25 | 7.4 | 0.17 |
| Flash Point ° F. | 200 | 463 | 93 |
| Asphaltenes, % | 0 | 0.81 | 0.11 |
| Ni, Fe, Al, ppm | NA | 14.2, 1.9, 1.6 | <0.1, <0.1, <0.1 |
| Viscosity max cS | 6 | 14.91 | 2.98 |

The vanadium was removed to below specification. The level of asphaltenes was reduced and this level can be further reduced by known processes, such as washing with hydrocarbon solvents. Other heavy metals, such as nickel, iron and aluminum were reduced to less than 0.1 ppm. Sulfur was reduced and can be further reduced with the use of sulfur adsorbents. The viscosity and flash point were reduced to under specification limits.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

Having described the invention, that which is claimed is:

1. A method for treating fuel containing vanadium comprising extracting vanadium from the fuel with an adsorption material and fractionating the fuel into a light fuel fraction and a heavy fuel fraction, whereby the light fuel fraction has a reduced amount of vanadium and wherein fractionation occurs in a fractionation column that is packed with vanadium adsorption materials.

2. The method of claim 1 wherein the fuel is fractionated in a column selected from the group consisting of fractionation column, distillation column, packed column, stripping column and bubble column.

3. The method of claim 2 further comprising feeding the heavy fuel fraction to a re-boiler for vaporizing the heavy fuel fraction and returning the vapor to the column to aid in fractionation.

4. The method of claim 2 further comprising feeding exhaust gas from a gas turbine to the column to aid in fractionation.

5. The method of claim 2 further comprising feeding the heavy fuel fraction to a boiler for combustion and producing steam and feeding the steam to the column to aid in fractionation.

6. The method of claim 1 wherein the vanadium adsorption material is selected from the group consisting of magnesium oxide, cobalt oxide, molybdenum oxide, activated carbon, zeolites and combinations thereof.

7. The method of claim 1 wherein the fuel is further fractionated into a gaseous phase and feeding said gaseous phase and said light fuel fraction to a gas turbine for fueling the gas turbine.

8. The method of claim 7 further comprising condensing the light fuel fraction and the gaseous phase in a condenser and separating the gaseous phase from the light fuel fraction in a separator.

9. The method of claim 1 further comprising oxidizing the heavy fuel fraction in a partial oxidation unit or autothermal cracking unit and recovering fuel having a reduced amount of vanadium.

10. The method of claim 1 further comprising extracting sulfur from the fuel.

* * * * *